United States Patent [19]

Leland

[11] Patent Number: 4,885,722

[45] Date of Patent: Dec. 5, 1989

[54] METHOD FOR REMOVING LOW-FREQUENCY NOISE FROM RECORDS WITH DATA IMPULSE

[75] Inventor: Frank Leland, Arlington, Tex.

[73] Assignee: Mobil Oil Corporation, New York, N.Y.

[21] Appl. No.: 145,014

[22] Filed: Jan. 19, 1988

[51] Int. Cl.[4] .............................................. G01V 1/40
[52] U.S. Cl. ........................................ 367/25; 367/43
[58] Field of Search ..................... 367/25, 43; 364/422

[56] References Cited

U.S. PATENT DOCUMENTS

| | | |
|---|---|---|
| 3,369,626 | 10/1968 | Zemanek, Jr. . |
| 3,676,842 | 5/1972 | Lee . |
| 3,718,204 | 2/1973 | Groenendyke . |
| 3,728,672 | 7/1973 | Dennis et al. . |
| 3,872,246 | 12/1975 | Schneider . |
| 4,736,348 | 4/1988 | Bednarczyk ......................... 367/69 |

OTHER PUBLICATIONS

"An Improved Median Window Filter to Provide Rounding of Extreme Values," Geophys (Austrailia), vol. 17, Jun. 1986.
"Compound Median Filtering Applied to Sonic Logi," 57th Annual Soc. Explor. Geophys. Int. Mtg.
Bednar, J. B., "Applications of Median Filtering to . . . Seismic Data," Geophysics, vol. 48 (12), Dec. 1983, pp. 1598-1610.
T. S. Huang, ed. *Two Dimensional Signal Processing II: Topics in Applied Physics*, vol. 43, Chap. 5&6, Springer Verlag, Berlin, 1981.
N. C. Gallagher and G. L. Wise, "A Theoretical Analysis of the Properties of Median Filters", *IEEE Trans. on ASSP.*, vol. ASSP-29, No. 6, Dec. 1981.
N. S. Jayant, "Average and Median Based Smoothing Techniques for Improving Digital Speech Quality in the Presence of Transmission Errors", *IEEE Trans. on Communications*, vol. COM-24, pp. 1043-1045, Sep. 1976.
T. S. Huang, G. L. Yang and G. Y. Yang, "A Fast Two-Dimensional Median Filtering Algorithm", *IEEE Trans. on ASSP.*, vol. ASSP-27, pp. 13-18, Feb. 1979.
G. R. Arce and N. C. Gallagher, "Stochastic Analysis for the Multiband Roof Signal Set of Median Filters", *16th Annual Princeton Conf. on Information Sciences and Systems*, Mar. 1982.
A. C. Bovik, T. S. Huang and D. C. Munson, Jr., "A Generalization of Median Filtering Using Linear Combination of Order Statistics", *IEEE Trans. on ASSP*, vol. ASSP-31, No. 6, Dec. 1983, pp. 1342-1349.

*Primary Examiner*—Thomas H. Tarcza
*Assistant Examiner*—Ian J. Lobo
*Attorney, Agent, or Firm*—Alexander J. McKillop; Charles J. Speciale; George W. Hager, Jr.

[57] ABSTRACT

A method for separating high frequency impulse data from received signal in which it is superimposed on low frequency noise is disclosed. Median filtering is applied to the received signal to remove the impulse data therefrom. The resultant filtered signal is subtracted from the original signal; the remainder includes only the impulses from the original signal. The invention is described in connection with borehole imaging and casing collar locating logging operations, both useful geophysical tools.

4 Claims, 3 Drawing Sheets

METHOD FOR REMOVING LOW-FREQUENCY NOISE FROM RECORDS WITH DATA IMPULSE

FIELD OF THE INVENTION

This invention relates to methods of processing data signals. More particularly, this invention relates to a method for improving the signal to noise ratio of data records of certain specific types, typically encountered in geophysical logging operations, in which the data is of generally impulse form superimposed on low frequency, partially correlated noise.

BACKGROUND OF THE INVENTION

Seismic exploration of the subterranean structure of the earth is a common practice. Typically low frequency acoustic energy is transmitted into the earth at a "shotpoint" and is detected by a "spread" of geophones; the resulting "traces", when properly organized, depict the reflection of the energy from interfaces between differing rock layers and hence provide a picture of the earth's structure.

Several methods for removal of noise to improve the signal-to-noise ratio of such low-frequency seismic signals are commonly practiced. The noise tends to be of higher frequency, such that low pass filtering methods are commonly employed. Furthermore, the noise is usually random, that is, uncorrelated. Accordingly, summing or "stacking" of "common depth point records", that is, plural records relating to reflection of the seismic energy from a single point within the earth, is useful to remove the uncorrelated noise from such low frequency data, effectively increasing the signal-to-noise ratio. These methods are well known to those of skill in the art.

Numerous types of "borehole" investigations are known in which various "logging" instruments are lowered into holes drilled into the earth. Such operations frequently generate data records in which the data takes the form of relatively high frequency impulses superimposed on low frequency background noise, which noise may be of partially correlated character, that is, generally sinusoidal. The methods of removing noise just discussed are frequently inapplicable to data records of the latter type.

For example, in borehole imaging applications, a rotating "camera" is moved axially along a borehole. The camera emits acoustic energy and detects the reflected signal. The reflected signal is indicative of the structure around the borehole, including cracks in the walls thereof. Such cracks appear as relatively high frequency impulses in the record, so that the impulses comprise the "data" to be recovered from the signal. Copending Ser. No. 899,135, filed Aug. 21, 1986, which is assigned to the assignee of this application, and which is incorporated herein by reference, fully discusses such borehole imaging systems. As discussed therein, noise in such signals tends to be low frequency noise caused by departure of the rotating camera from the center of the borehole. As noted, the data to be recovered is "impulses", that is, relatively discontinuous high frequency changes in the amplitude of the reflected signal. The data impulses correspond to fractures in the earth's structure surrounding the borehole. Since these fractures indicate possible locations for removal of hydrocarbons, and provide additional clues to the structure of interest, the impulses in the signal are very significant. To interpret such a signal accurately requires that the "impulses" be effectively removed from the noise. As indicated, the noise typically relates to the spacing of the tool from the center of the borehole, and other generally correlated variables, so that the noise tends to be of sinusoidal, slowly varying character as the tool moves from one part of the hole to another.

High frequency "impulse" data which is superimposed on and obscured by low frequency noise is also encountered in connection with the so-called "casing collar locating" technique. As will be understood by those of skill in the art, "casing collars" are pipe couplings which connect the sections of pipe making up the casing of a borehole. These collars can be used to provide absolute indications of the depth of the corresponding logging tool in the hole, if they can be reliably detected. Other methods of measurement of depth tend to be inaccurate, due to cable stretch and other factors. Accordingly, it is conventional to use the location of the collars in the casings as objective indications of depth.

A typical casing collar locating tool comprises a magnetic device for detecting variations in the amount of ferromagnetic material in its vicinity, i.e. the steel of the pipe and collar. When such a tool is moved up and down in the borehole, a low frequency signal with impulses is generated. The overall amplitude of the signal varies slowly, again due to variation in spacing of the tool from the center of the hole and other slowly-varying parameters, while relatively high frequency impulses are superimposed thereon corresponding to the casing collars. As indicated above, it would be desirable to remove the low frequency noise, leaving the impulses indicating the presence of the collars, such that the tool depth data thus collected could be adequately analyzed.

Prior techniques for removing low frequency noise and leaving the high frequency data behind have not been as efficient as desired. One possibility would clearly be high pass filtering. Specifically, if the received data signal $Z(t)$ is equal to the sum of the actual signal $S(t)$ and the noise signal $N(t)$, and if $S(t)$ and $N(t)$ have clearly differing frequencies, filtering can be relatively efficient in removing $N(t)$. However, if as is more common the combination is multiplicative, such that $Z(t)=S(t)N(t)$, simple filtering is not adequate, and normally involves some distortion of the signal.

One attempt to solve this problem is described in U.S. patent application Ser. No. 899,135 referred to above. In that application a "homomorphic" filtering technique is described. According to this technique, the logarithm of $Z(t)$ is taken, and $\ln Z(t)$ is then decomposed by filtering. If $Z(t)=S(t)N(t)$, as above, $\ln Z(t)=\ln S(t)+\ln N(t)$. Hence if the frequencies of $N(t)$ and $S(t)$ differ, frequency domain filtering can be employed to separate $N(t)$ from $S(t)$. The result can then be transformed back to the time domain and exponentiated, yielding $S(t)$.

However, unless $N(t)$ and $S(t)$ are indeed primarily located in different frequency bands, the homomorphic filtering technique poses certain problems, particularly in connection with the selection of the appropriate cutoff frequency. In general, any linear filtering technique tends to distort the data; this makes it difficult, for example, to interpret the casing collar log data accurately.

Accordingly there is a need in the art for an improved method of processing seismic data of the type in which the data takes the form of impulses superimposed on relatively low frequency, partially correlated noise.

The present inventor is aware of a conventional digital signal processing technique known as "median filtering", which has been employed in connection with processing of television signals and the like. Median filtering is described a number of references, including the following:

T. S. Huang, ed., *Two Dimensional Signal Processing II: Topics in Applied Physics*, Vol. 43, Chap. 5 & 6, Springer Verlag, Berlin, 1981; N. C. Gallagher and G. L. Wise, "A Theoretical Analysis of the Properties of Median Filters", *IEEE Trans. on ASSP*, vol. ASSP-29, No. 6, December, 1981; N. S. Jayant, "Average and Median Based Smoothing Techniques for Improving Digital Speech Quality in the Presence of Transmission Errors", *IEEE Trans. on Communications*, vol. COM-24, pp. 1043-1045, September, 1976; T. S. Huang, G. L. Yang and G. Y. Yang, "A Fast Two-Dimensional Median Filtering Algorithm", *IEEE Trans. on ASSP*, vol. ASSP-27, pp. 13-18, February, 1979; G. R. Arce and N. C. Gallagher, "Stochastic Analysis for the Multiband Roof Signal Set of Median Filters", *16th Annual Princeton Conf. on Information Sciences and Systems*, March 1982; and A. C. Bovik, T. S. Huang and D. C. Munson Jr., "A Generalization of Median Filtering Using Linear Combination of Order Statistics", *IEEE Trans. on ASSP*, vol. ASSP-31, No. 6, December, 1983, pp. 1342-1349.

In median filtering, successive subsets of a complete series of samples of the signal are placed into successive "windows" containing an odd number M of samples. For example, if M=5, the first window of samples $S_1$, $S_2 \ldots S_n$ would contain $S_1$, $S_2$, $S_3$, $S_4$ and $S_5$; the second $S_2$-$S_6$; and so on. The samples in each window are then ordered by magnitude. The median value, that is, the value which is in the center of the ordered samples, then becomes the output sample corresponding to each window. That is, the median value of the data samples in each window becomes the corresponding value of the filtered signal.

For example, suppose the signals in a given seven-sample window are 1, 11, 8, 3, 4, 6, and 2. Conventional linear filtering would take the average of that window, that is, add up the values and divide by the number of samples, in this case 35/7=5. According to the median filtering technique, the samples are first ordered, thus appearing as 1, 2, 3, 4, 6, 8, 11. The median or central value, in this case 4, is then selected as the value of the filtered signal corresponding to that particular window. The window is then moved over one sample, and the process repeated.

Because the samples of the higher amplitude impulse data (in the example, the 8 and 11 values) will be located to one end of each window after the samples are ordered, median filtering can be used effectively to remove impulses from signals. That is, since the samples of the impulse data are always at one end of the window, they never become the median value in the ordered data in the window, and are never selected as the value for the filtered data signal. Accordingly, the impulses are removed.

The degree to which median filtering removes impulses depends in a simple and intuitively understood manner on the length of the window relative to the width of the impulses. The median-filtering process is well understood, as discussed in the references listed above, and can readily be implemented to remove impulses as desired.

SUMMARY OF THE INVENTION

According to the present invention, median filtering techniques are applied to seismic data signals of types comprising impulses of data superimposed over relatively low-frequency noise. The data impulses are removed from the record by the median filtering process. The thus-processed record is then subtracted from the original record, so that the low frequency signal which is common to both is cancelled. The remainder is the impulse data from the original record. This signal can then be processed in any desired manner.

BRIEF DESCRIPTION OF THE DRAWINGS

The invention will be better understood if reference is made to the accompanying drawings, in which.

DESCRIPTION OF THE PREFERRED EMBODIMENTS

FIG. 1 illustrates data logging operations according to the invention, in which the process of the invention is useful.

Figures 1A, 1B, 1C:
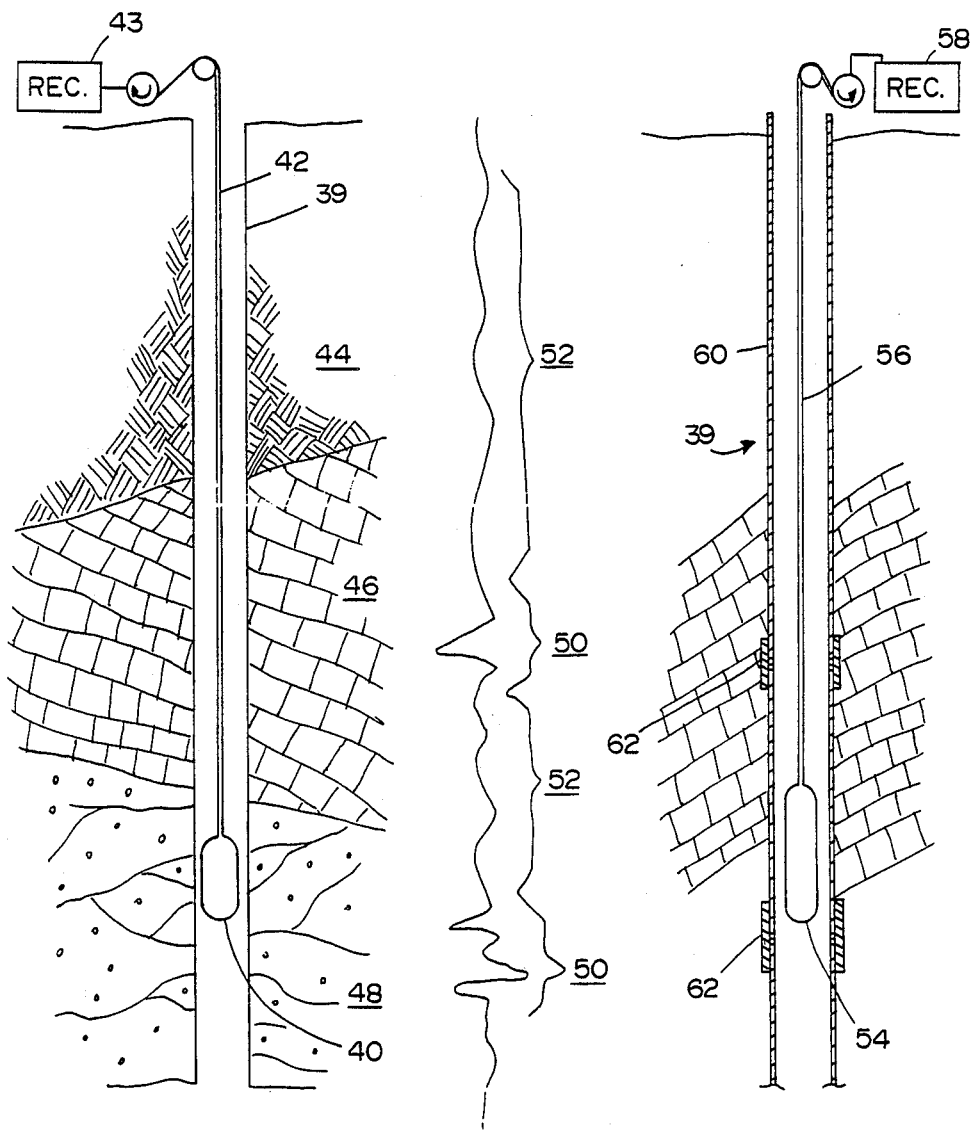
FIG. 1 shows in FIG. 1(a) a typical borehole imaging arrangement, in FIG. 1(b) a typical received signal, and in FIG. 1(c) a typical casing-collar logging operation.

More particularly, FIGS. 1(a), (b) and (c) show respectively a typical borehole imaging logging arrangement, a typical received signal, and a typical casing collar locating logging operation. The signal shown in FIG. 1(b), which represents amplitude as a function of depth along the borehole, is generally indicative of signals conventionally recorded in the operations depicted in FIGS. 1(a) and (c).

In the borehole imaging operation of FIG. 1(a), a borehole imaging tool 40 is lowered down the borehole 39. Tool 40 rotates, emitting acoustic energy into the earth, and detecting its reflection. A signal generated by a suitable transducer responsive to reflection of the acoustic energy from the structure surrounding the borehole 39 is transmitted by the tool 40. The signal travels upwardly along a cable 42, and may be recorded for analysis as indicated at 43. As the tool 40 passes through various strata 44, 46, 48 in the earth, different signals are detected.

The copending application referred to above provides details of the tool, its operation and the resultant signal, an example of which is shown in FIG. 1(b). For example, in a stratum 48 which is fractured as indicated, the signals transmitted by the borehole imaging tool 40 exhibit high amplitude impulses, as indicated on the signal of FIG. 1(b) at 50; at other points in the borehole, the signal is generally sinusoidal in character, as indicated generally at 52. Such low-frequency variations in amplitude are due, for example, to variation in distance of the tool from the wall of the borehole and the like. Accordingly, in order to locate the fracture zone 48 (which may be indicative of a region containing recoverable oil or gas) it is necessary to separate the high frequency impulse pulses 50 from the low frequency noise 52 from the remainder of the hole. This can be done according to the invention as described below.

A similar processing problem is presented by the signals from a casing collar locating logging operation, as depicted schematically in FIG. 1(c). A casing collar logging operation is designed to simply detect the presence of collars 62 connecting sections of the casing 60 surrounding the borehole 39. A casing collar logging tool 54 is lowered down the borehole 39 on a cable 56 and transmits a signal which is recorded at 58 for analysis. A typical casing collar locating tool 54 may simply comprise a number of magnets and receiving coils; the coils detect variation in the amount of ferromagnetic material in the vicinity of the tool 54 due to the consequent change in the effect on the magnetic field emitted by the magnets. Hence, the tool can be used to detect the steel collars 62 surrounding the steel casing 60. Accordingly, impulses 50 in a typical received waveform as shown in FIG. 1(b) can provide an objective indication of the location of the collars 62; since the spacing of the collars 62 is known, their location can be used to provide a reliable indication of the depth of the tool 54 within the borehole 39, which can be used for various other purposes.

The signal processing problem presented by the casing collar log operation of FIG. 1(c) is, as mentioned, similar to that of the borehole imaging operation of FIG. 1(a). In each case, the impulses 50 which are the data of interest must be separated from low frequency, generally sinusoidal noise 52. As indicated, this problem is contrary to the usual seismic case, in which the data is low-frequency sinusoids and the noise is high-frequency impulses. Accordingly, conventional methods of improving the signal-to-noise ratio of seismic signals are not useful in connection with the operations shown in FIGS. 1(a) and 1(c).

Figure 2:
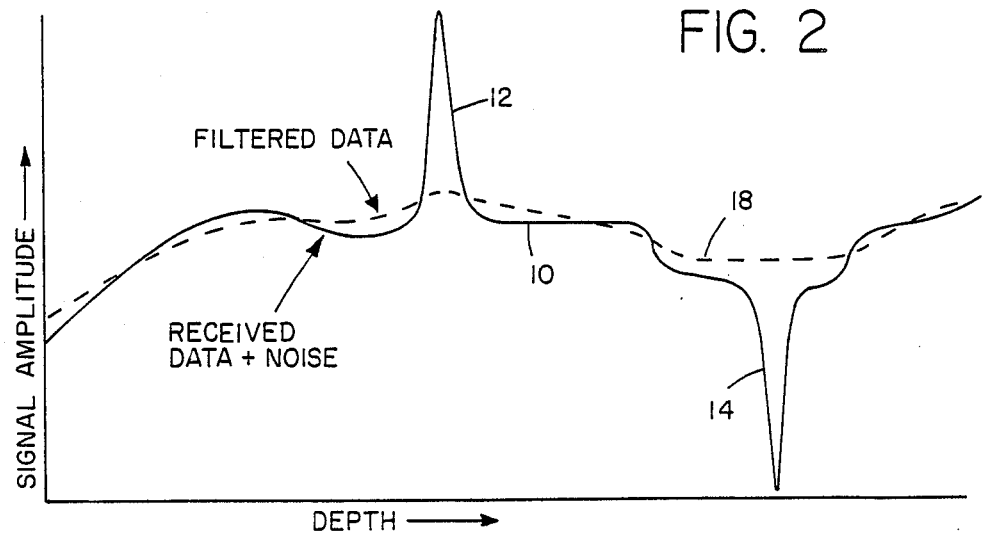
FIG. 2 shows a typical seismic signal (amplitude as a function of borehole depth) having been received from a well-logging instruments, such as a borehole imaging apparatus, or a casing collar locating tool, and illustrates the result of application of conventional filtering techniques.

FIG. 2 shows an example of a typical received data signal 10 received from a borehole imaging or casing collar logging operation. The waveform of FIG. 2 represents signal amplitude versus depth of the tool in the borehole, as indicated; this is true of all signals shown in the Figures of this application. As indicated, this signal has a relatively low frequency component which is more or less sinusoidal, and has several relatively steep "impulses+ 12, 14 of data to be recovered superimposed thereon.

As discussed above, it is more common in seismic applications that the signals of interest are of low frequency sinusoids having uncorrelated high frequency noise thereon, e.g. impulse noise or the like. The impulse noise can be removed by low pass filtering, common depth point stacking or combinations of these and other known techniques. However, in the present case, in which signals recorded with respect to casing collar logging operations made using magnetic transducers or borehole imaging logs made using acoustic transducers are to be processed, it is the impulses 12, 14 which are of interest, while the low frequency noise 10 is to be discarded. It might be suggested that normal high pass filtering would be useful in such a process. However, linear high pass filtering is essentially an averaging process. The result of application of a typical averaging process to the signal 10 is shown by a dotted line 18. As indicated, the averaging process tends to flatten out excursions in the signal. This is particularly noticeable in the case of impulses 12 and 14, as indicated by the averaged wave form 18. Moreover, since the impulses 12, 14 are not completely removed in the averaging process, but are merely reduced in amplitude and spread by the averaging process, the averaged signal cannot simply be subtracted from the original record to yield the impulses.

Furthermore, implementation of band pass filtering presents certain problems. The correct selection of the band pass filter cut-off frequency to be employed is particularly difficult. In many cases of interest, the frequency-domain distinction between the high frequency data to be recovered and the low frequency noise to be discarded is very difficult to draw with accuracy. Schemes have been proposed for adaptive filtering, but these are very difficult to implement properly.

Figure 3B:
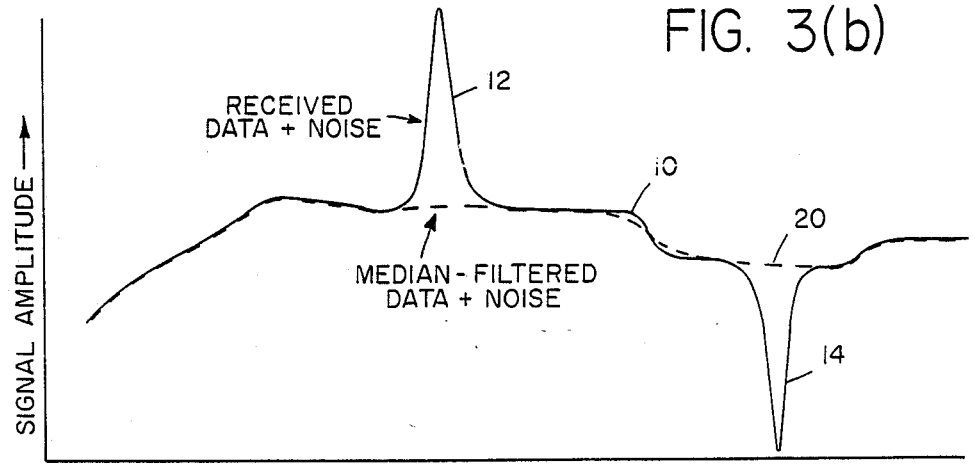
FIG. 3 shows in FIG. 3(a) the signal of FIG. 2 after having been median filtered according to the invention, and shows in FIG. 3(b) the signal of FIG. 3(a) after subtraction from the received data, both in a relatively ideal case.
Figure 3A:
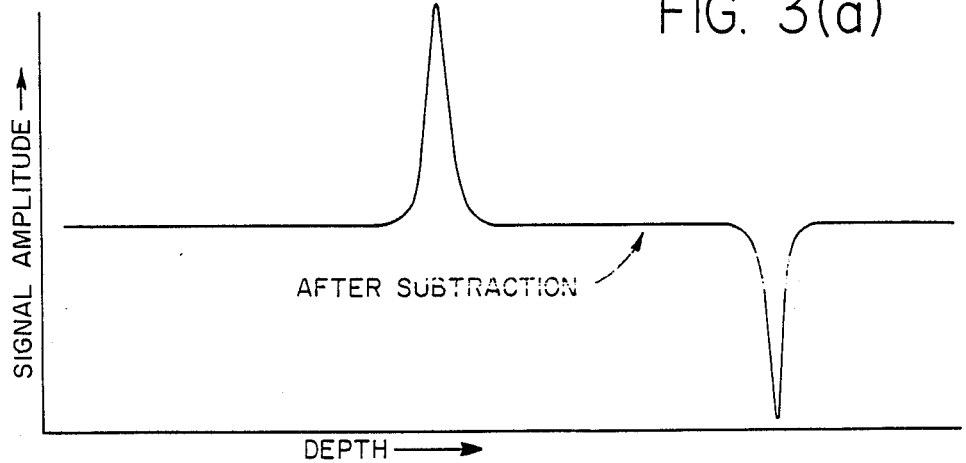

FIG. 3(a) shows the same received data signal 10 shown in FIG. 2, and shows in dotted line 20 the median filtered data signal provided according to one aspect of the invention. As indicated, the impulses 12, 14 are removed completely while little alteration of the remainder of the waveform 10 occurs elsewhere.

As indicated above, in the median filtering process "windows" comprising an odd number of data samples are established and are moved along the data one sample at a time. The data samples in the window are ordered according to their amplitude, and the median value, that is, the central one of the ordered values, which has an equal number of sample values above and below it in the sequence, is selected as the value for the filtered signal corresponding to that particular window.

For example, suppose the input signal was successively sampled yielding the following sequence of values: 4, 5, 6, 4, 4, 5, 6, 12, 16, 11, 7, 4, 5, 6, 5, 4, 7. A impulse reaching an amplitude of 16 is thus present in data averaging roughly 5. If a typical ideal (that is, unweighted) seven-sample averaging technique were employed to filter this data, the results (for full 7-sample windows only) would be 4.8, 5.9, 7.5, 8.3, 8.7, 8.8, 8.7, 8.7, 7.7, 5.9, and 5.4. Clearly the peak has been flattened and spread.

By comparison, the same data, if median filtered using a seven-sample window (again for full sample windows only) yields the following sequence: 5, 5, 6, 6, 7, 7 7, 7, 6, 5, 5. It can readily be observed that using median filtering the peak is removed much more completely with less distortion of the remaining waveform than occurs with simple averaging in a linear filtering operation. The disparity becomes more pronounced as the peaks grow higher.

In essence, the median-filtering process removes the peaks completely so long as they are less than half the width of the window. That is, the width of the window is chosen with and spacing respect to the width of the typical impulses so that the high amplitude data values of the impulse never become the median. In effect, the process of the invention is thus useful for recovery of data signals consisting of impulses of generally periodic character, whereby the window length can be chosen by the operator to avoid inclusion of more than one data impulse in a single window. Accordingly, when the reordering step moves the high amplitude sample values due to the impulse in the data in the window towards one end of the ordered data values, the impulse samples are prevented from becoming the median and therefore from contributing to the filtered signal. There is essentially no distortion of the impulses, as occurs in connection with averaging filtering; instead the impulses are simply removed.

FIG. 3(b) shows the result of subtraction of the median-filtered waveform 20 from the original wave form 10 according to the invention. Since the median filtering process essentially does not affect the low frequency noise to be removed, the remainder after the subtraction step is simply the impulses 12, 14. This signal, having had the low-frequency noise removed according to the invention, is relatively straightforward to analyze, e.g. to detect the position of casing collars, or to evaluate fracturing of the wall of the borehole As the median filtering process is non-linear, it is not generally possible to describe it by a mathematically precise transfer function. However, it is the understanding of the inventor that the distortion is limited to amplitude, and does not involve distortion in time. This fact is significant in the analysis of the filtered signal, e.g., to evaluate fracturing in a borehole using a borehole imaging log, or location of the casing collars in a casing collar log. Accordingly, the peak distortion which can occur in the median filtering process does not prevent the data from being useful. By comparison, the averaging occurring in conventional linear filtering spreads peaks in the data, as noted above, distorting them in time.

Figure 4:
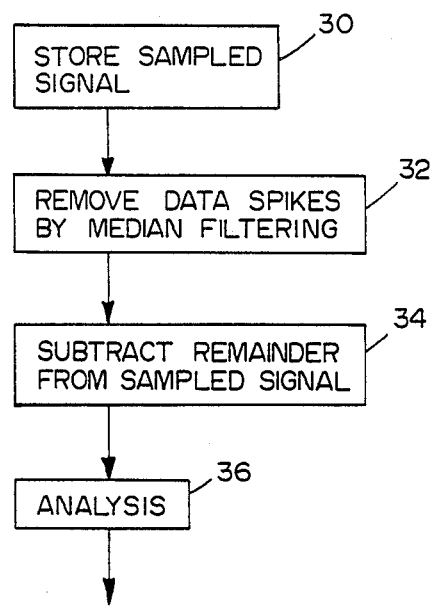
FIG. 4 shows in block diagram form exemplary steps in the practice of the invention.

FIG. 4 shows schematically the steps in practice of the method according to the invention. At step 30, the sampled signal is stored. At step 32 the data impulses are removed by median filtering, as described above. In essence, and as noted above, this process simply involves selecting successive odd numbers of samples of data in "windows", ordering the samples in each window according to amplitude, and placing the value of the median sample value in the particular window in the corresponding position in the filtered waveform.

At step 34, the filtered data resulting from step 32 is subtracted from the sampled signal; the remainder is the impulse data. At step 36 the remainder, essentially the high frequency impulse data having had the low frequency noise removed, may be analyzed in any convenient manner.

While a preferred embodiment of the signal-processing technique of the invention and several areas for its application have been described, it should be appreciated that there are quite possibly other areas in seismic prospecting in which the method of separating relatively high frequency "impulsive" data signals from relatively low frequency superimposed noise may find use. Therefore, while several preferred embodiments of the invention have been described, these should not be taken to limit the invention, which is to be limited only by the following claims.

I claim:

1. Method for separating high frequency impulse data of known generally periodic character in a signal recorded in a borehole logging operation from low frequency noise superimposed thereon, comprising the steps of:

storing the recorded signal;

applying median filtering to said stored signal, such that the impulses are removed from the median-filtered signal, said step of applying median filtering to the stored signal comprising the further steps of:

sampling the signal at regular intervals of time;

defining the length of a data window consisting of a predetermined number of samples of said signal, said number being predetermined in accordance with the known generally periodic character of the signal, such that no one data window includes more than one impulse;

successively ordering samples of said signal in said windows by amplitude; and employing the median-valued sample in each window as the corresponding value of the median-filtered signal; and subtracting the median-filtered signal from the stored signal.

2. The method of claim 1, wherein said stored signal comprises a series of samples of a received signal and said median filtering step comprises the steps of successively selecting sequences of said samples and assigning said samples to windows, ordering the samples in the windows, and selecting the median value from the ordered samples in each particular window as the value of the filtered signal corresponding to that window.

3. The method of claim 1 wherein said received signal is a borehole imaging signal obtained in a borehole imaging logging operation.

4. The method of claim 1 wherein received signal is a casing collar location signal received in a casing collar logging operation.

* * * * *